United States Patent
Miao et al.

(10) Patent No.: US 12,050,097 B2
(45) Date of Patent: Jul. 30, 2024

(54) LENGTH MEASUREMENT METHOD FOR CONICAL WORKPIECE BASED ON DUAL DISPLACEMENT SENSORS

(71) Applicant: BEIJING AEROSPACE INSTITUTE FOR METROLOGY AND MEASUREMENT TECHNOLOGY, Beijing (CN)

(72) Inventors: Yinxiao Miao, Beijing (CN); Xiaosan Wang, Beijing (CN); Fengju Sun, Beijing (CN); Lei Yan, Beijing (CN); Tian Bai, Beijing (CN); Qigang Huang, Beijing (CN); Ruidong Huo, Beijing (CN); Yilin Dai, Beijing (CN); Junhong Tian, Beijing (CN)

(73) Assignee: BEIJING AEROSPACE INSTITUTE FOR METROLOGY AND MEASUREMENT TECHNOLOGY, Beijing (CN)

( * ) Notice: Subject to any disclaimer, the term of this patent is extended or adjusted under 35 U.S.C. 154(b) by 0 days.

(21) Appl. No.: 18/411,976

(22) Filed: Jan. 12, 2024

(65) Prior Publication Data
US 2024/0151514 A1    May 9, 2024

(30) Foreign Application Priority Data
Jan. 13, 2023  (CN) .......................... 202310061852.0

(51) Int. Cl.
*G01B 11/02*    (2006.01)
*G01B 5/02*     (2006.01)
(Continued)

(52) U.S. Cl.
CPC .............. *G01B 11/026* (2013.01); *G01B 5/02* (2013.01); *G01B 5/241* (2013.01); *G01B 7/02* (2013.01)

(58) Field of Classification Search
CPC ........ G01B 11/026; G01B 5/02; G01B 5/241; G01B 7/02
See application file for complete search history.

(56) References Cited

U.S. PATENT DOCUMENTS 5,377,236 A * 12/1994 Smith .................... G21C 21/00
                                                    376/245
2013/0238129 A1* 9/2013 Rose .................... B25J 19/0029
                                                    700/258

FOREIGN PATENT DOCUMENTS

| CN | 2510369 Y    | 9/2002  |
|----|--------------|---------|
| CN | 101886918 A  | 11/2010 |

(Continued)

*Primary Examiner* — Jonathan M Hansen

(57) ABSTRACT

A conical workpiece length measurement method is provided. Two laser displacement sensors are symmetrically arranged at opposite sides of a to-be-measured conical workpiece or a tooling loaded with the to-be-measured conical workpiece. Distance $X_0$ from each displacement sensor to a bottom plane of the to-be-measured conical workpiece is calibrated. An elongated base plate is arranged at a tip of the to-be-measured conical workpiece, and the two displacement sensors measure their respective distances to the base plate. The total length of the to-be-measured conical workpiece is calculated as follows: $X=X_0+(X_1+X_2)/2$, where $X_1$ represents distance from one of the two displacement sensors to the base plate, and $X_2$ represents distance from the other of the two displacement sensors to the base plate. Factors influencing the length measurement include calibration of the fixed length, measurement accuracy of the displacement sensor and a tilt error of the base plate.

3 Claims, 3 Drawing Sheets

(51) Int. Cl.
   *G01B 5/24*     (2006.01)
   *G01B 7/02*     (2006.01)

(56)           References Cited

FOREIGN PATENT DOCUMENTS

| | | |
|---|---|---|
| CN | 102564386 A | 7/2012 |
| CN | 104089680 A | 10/2014 |
| CN | 109596195 A | 4/2019 |
| CN | 110186392 A | 8/2019 |
| CN | 110398203 A | 11/2019 |
| CN | 211042100 U | 7/2020 |
| CN | 211425357 U | 9/2020 |
| CN | 211953883 U | 11/2020 |
| CN | 114485465 A | 5/2022 |
| CN | 115077452 A | 9/2022 |
| CN | 217877568 U | 11/2022 |
| WO | 2014175412 A1 | 10/2014 |

\* cited by examiner

LENGTH MEASUREMENT METHOD FOR CONICAL WORKPIECE BASED ON DUAL DISPLACEMENT SENSORS

CROSS-REFERENCE TO RELATED APPLICATIONS

This application claims the benefit of priority from Chinese Patent Application No. 202310061852.0, filed on Jan. 13, 2023. The content of the aforementioned application, including any intervening amendments made thereto, is incorporated herein by reference in its entirety.

TECHNICAL FIELD

This application relates to length measurement, and more particularly to a length measurement method for a conical workpiece based on dual displacement sensors.

BACKGROUND

The existing sensor-based length measurement methods basically focus on the size measurement of regular objects, and are often considered as not suitable for the size measurement of irregular objects due to the poor accuracy. Although there are some size measurement methods for the irregular objects in the prior art, all of them require complex data processing, which is time-consuming and labor-intensive.

SUMMARY

In view of the above deficiencies in the prior, the disclosure provides a length measurement method for a conical workpiece based on dual displacement sensors, which can achieve the rapid and accurate measurement of conical workpiece length.

In order to achieve the above object, the following technical solutions are adopted.

In a first aspect, this application provides a length measurement method for a conical workpiece, comprising:

symmetrically arranging a first displacement sensor and a second displacement sensor at two opposite sides of a to-be-measured conical workpiece, respectively;

obtaining a distance $X_0$ from each of the first displacement sensor and the second displacement sensor to a bottom plane of the to-be-measured conical workpiece through pre-calibration;

arranging a base plate in an elongated shape at a tip of the to-be-measured conical workpiece; and measuring, by the first displacement sensor, a distance from the first displacement sensor to the base plate, and measuring, by the second displacement sensor, a distance from the second displacement sensor to the base plate; and calculating a total length X of the to-be-measured conical workpiece as according to the following formula: $X=X_0+(X_1+X_2)/2$, wherein $X_1$ is the distance from the first displacement sensor to the base plate, and $X_2$ is the distance from the second displacement sensor to the base plate.

In a second aspect, this application provides a length measurement method for a conical workpiece, comprising:

arranging a to-be-measured conical workpiece in a tooling, symmetrically arranging a first displacement sensor and a second displacement sensor at two opposite sides of the tooling, respectively;

obtaining a distance $X_0$ from each of the first displacement sensor and the second displacement sensor to a bottom plane of the to-be-measured conical workpiece through pre-calibration;

arranging a base plate in an elongated shape at a tip of the to-be-measured conical workpiece; and measuring, by the first displacement sensor, a distance from the first displacement sensor to the base plate, and measuring, by the second displacement sensor, a distance from the second displacement sensor to the base plate; and calculating a total length X of the to-be-measured conical workpiece as according to the following formula: $X=X_0+(X_1+X_2)/2$, wherein $X_1$ is the distance from the first displacement sensor to the base plate, and $X_2$ is the distance from the second displacement sensor to the base plate.

In some embodiments, the distance from each of the first displacement sensor and the second displacement sensor to the bottom plane of the to-be-measured conical workpiece is determined by machining of the tooling and actual installation of the first displacement sensor and the second displacement sensor.

In some embodiments, factors affecting length measurement of the to-be-measured conical workpiece comprise tooling-based calibration of a fixed length $X_0$, measurement accuracy of the first displacement sensor and the second displacement sensor and a tilt error of the base plate.

In some embodiments, the to-be-measured conical workpiece is measured multiple times, and a minimum measured value is used as a final length measurement result.

Compared with the prior art, this disclosure has the following advantages.

1. This application adopts a symmetrical measurement method based on dual laser displacement sensors. The distances from the two displacement sensors to the base plate are respectively measured by the two displacement sensors, so as to obtain the length of the conical workpiece. This not only solves the problem of measurement accuracy, but also ensures measurement efficiency and makes full use of obtained data, thereby improving measurement accuracy. The reasonable arrangement reduces the calculation complexity and avoids additional calculations, thus achieving the high-precision and rapid measurement.

2. Compared with traditional measurement methods, this application is not limited by the tooling of the conical workpiece during the measuring process. Even if the to-be-measured conical workpiece has been placed in the tooling, the accurate measurement can also be performed.

3. Multiple measurements are performed to obtain the minimum value, so as to further improve the measurement accuracy.

DETAILED DESCRIPTION OF EMBODIMENTS

The present disclosure will be described in detail below with reference to the accompanying drawings and embodiments.

In this application, a total length of a to-be-measured conical workpiece is measured using a symmetrical measurement method based on dual laser displacement sensors. If there is no tooling available for the to-be-measured conical workpiece, a first displacement sensor and a second displacement sensor are symmetrically arranged at two opposite sides of the to-be-measured conical workpiece, respectively. A distance $X_0$ from each of the first displacement sensor and the second displacement sensor to a bottom plane of the to-be-measured conical workpiece is obtained through pre-calibration. When measuring length, a base plate in an elongated shape is arranged at a tip of the to-be-measured conical workpiece. A distance from the first displacement sensor to the base plate is measured by the first displacement sensor, and a distance from the second displacement sensor to the base plate is measured by the second displacement sensor. A total length X of the to-be-measured conical workpiece as according to the following formula: $X=X_0+(X_1+X_2)/2$, where $X_1$ is the distance from the first displacement sensor to the base plate, and $X_2$ is the distance from the second displacement sensor to the base plate.

Figure 1:
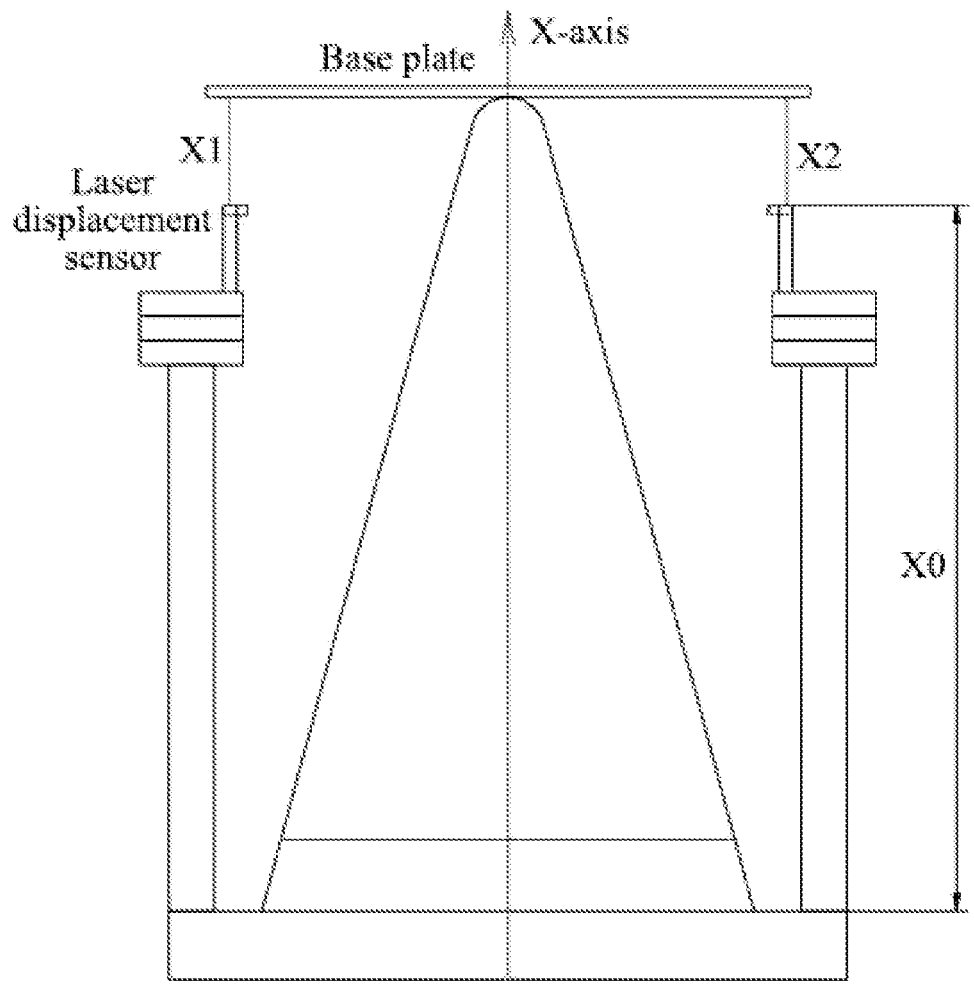
FIG. 1 is a schematic diagram of length measurement in accordance with an embodiment of the present disclosure.

If the to-be-measured conical workpiece has a tooling, the length measurement of the embodiment of the present disclosure is shown in FIG. 1. The to-be-measured conical workpiece is placed in the tooling. A first displacement sensor and a second displacement sensor are symmetrically arranged at two opposite sides of the tooling, respectively. A distance from each of the first displacement sensor and the second displacement sensor to the bottom plane of the to-be-measured conical workpiece is determined by machining of the tooling and actual installation of the first displacement sensor and the second displacement sensor, which can be obtained through pre-calibration, assumed to be $X_0$. When measuring length, a base plate in an elongated shape is arranged at a tip of the to-be-measured conical workpiece. A distance from the first displacement sensor to the base plate is measured by the first displacement sensor, and a distance from the second displacement sensor to the base plate is measured by the second displacement sensor. A total length X of the to-be-measured conical workpiece as according to the following formula: $X=X_0+(X_1+X_2)/2$, where $X_1$ is the distance from the first displacement sensor to the base plate, and $X_2$ is the distance from the second displacement sensor to the base plate.

In this embodiment, factors affecting length measurement of the to-be-measured conical workpiece include tooling-based calibration of a fixed length $X_0$, measurement accuracy of the first displacement sensor and the second displacement sensor and a tilt error of the base plate. The calibration of $X_0$ is obtained from a standard-length sample. The two laser displacement sensors are selected with a measuring range of 200±80 mm and a repeatability of 0.2 mm. The tilt error of the base plate is analyzed through the following steps.

It is assumed that the tip of the to-be-measured conical workpiece or a limited portion of the to-be-measured conical workpiece in contact with the base plate is in a sphere shape. A sphere equation is expressed as follows with a sphere center as an origin of a coordinate system:

$$x^2+y^2+z^2=R^2.$$

In the above equation, R is a sphere radius, and coordinates of a vertex of the to-be-measured conical workpiece are (0, 0, R). A measurement error caused by the fact that a contact point between the to-be-measured conical workpiece and the base plate is not exactly at the vertex during actual measurement is considered. An angle between the contact point and an x-axis is assumed to be θ, and an angle between a projection of the contact point on a y-z plane and a y-axis is assumed to be φ, such that as shown in FIG. 2, coordinates of the contact point are expressed as:

$$(x,y,z)=(R\cos\theta, R\cos\varphi\sin\theta, R\sin\varphi\sin\theta).$$

Figure 2:
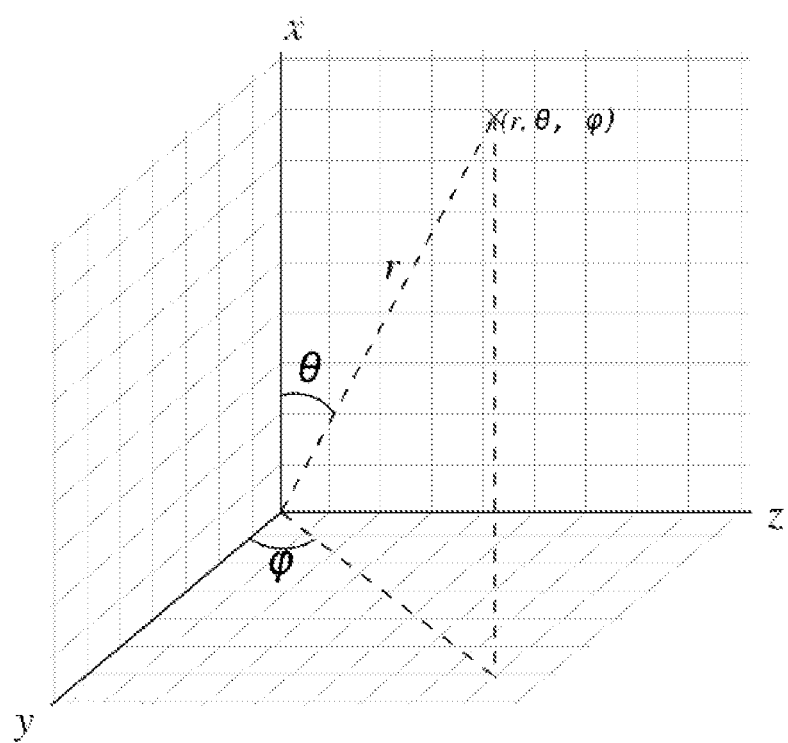
FIG. 2 a schematic diagram of coordinates of a contact point between a base plate and a tip of a to-be-measured conical workpiece in accordance with an embodiment of the present disclosure.

As illustrated in FIG. 2, $\varphi \in (0, 2\pi)$, and θ is required to be as small as possible. Furthermore, a tangent plane of the base plate defined by the contact point is expressed as:

$$\cos\theta x+\cos\varphi\sin\theta y+\sin\varphi\sin\theta z=R.$$

For the convenience of analysis, it is assumed that the first displacement sensor and the second displacement sensor are both arranged on a z-axis, and coordinates of the first displacement sensor and the second displacement sensor are P1 (0,−b) and P2 (0, b), respectively. Therefore, an x-axis coordinate of an intersection point between a laser emitted by the first displacement sensor and a plane of the base plate, and an x-axis coordinate of an intersection point between a laser emitted by the second displacement sensor and the plane of base plate are respectively expressed as:

$$x_1 = \frac{R+b\sin\varphi\sin\theta}{\cos\theta} \text{ and } x_2 = \frac{R-b\sin\varphi\sin\theta}{\cos\theta}.$$

Analysis is performed under the following cases.

(I) If the contact point between the plane of the base plate and the tip of the to-be-measured conical workpiece is at the vertex, θ=0, and $x_1=x_2=R$. A height h of a sphere top is calculated by averaging distances measured by the first displacement sensor and the second displacement sensor, expressed as:

$$h = \frac{x_1+x_2}{2} = R.$$

(II) If the contact point between the plane of the base plate and the tip of the to-be-measured conical workpiece is offset from the vertex, the height h of the sphere top is calculated by averaging the distances measured by the first displacement sensor and the second displacement sensor, expressed as:

$$h = \frac{x_1+x_2}{2} = \frac{R}{\cos\theta}.$$

An error E between the height h and a true value R is expressed as:

$$E = \frac{h-R}{R} = \frac{1-\cos\theta}{\cos\theta}.$$

Figure 3:
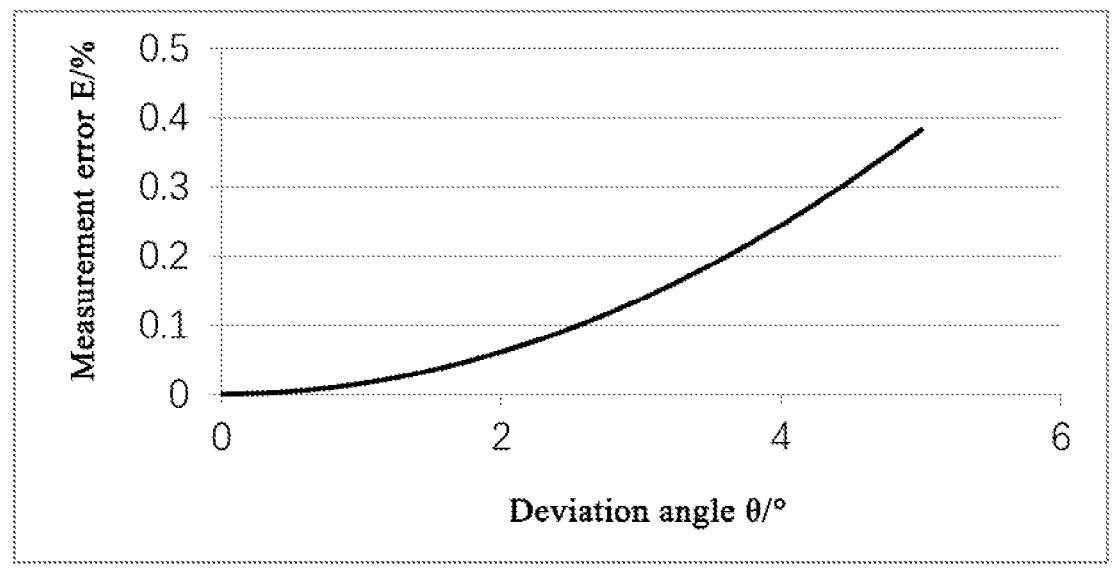
FIG. 3 schematically shows a relationship between a length measurement error and an x-axis deviation angle in accordance with an embodiment of the present disclosure.

It can be seen that a measurement error of the first displacement sensor and the second displacement sensor is only related to the angle θ between the contact point and the x-axis, and is unrelated to the angle φ between the contact point and the y-axis. When the angle θ exists, a measured value h is larger than the true value R. When the angle θ is within 5°, the measurement error is approximately within 0.38%, and a change trend of the measurement error is illustrated in FIG. 3. A percentage of the measurement error is expressed relative to the radius of the sphere. It is assumed that the radius of the sphere is 100 mm, when the deviation angle is 5°, a linear displacement of the contact point on the top surface is approximately 8.7 mm. This contact error is visible to the naked eye. The measurement error at this time is 0.38%, which is approximately 0.38 mm. Taking the above factors into account, the measurement method provided herein can ensure the measurement accuracy requirement of 1 mm required for the conical workpiece.

Furthermore, the difference $\Delta x$ between the distances measured by the first displacement sensor and the second displacement sensor is analyzed. A relationship between the difference $\Delta x$, the angle $\theta$ and the angle $\varphi$ is expressed as:

$$\Delta x = x_1 - x_2 = \frac{2b\sin\varphi\sin\theta}{\cos\theta} = 2b\sin\varphi\tan\theta.$$

It can be concluded that the difference between the distances measured by the first displacement sensor and the second displacement sensor mainly depends on the angle $\theta$, and an upper limit of the difference is determined by the angle $\theta$, and the angle $\varphi$ make the difference change sinusoidally within a range of the upper limit. Therefore, if the difference between the distances measure by the first displacement sensor and the second displacement sensor is 0, due to a possibility that the angle $\varphi$ is just near 0° or 180°, it still fails to confirm that the base plate is located horizontally, and there is no measurement error. Therefore, the to-be-measured conical workpiece is measured multiple times, and a minimum measured value is used as a final length measurement result, which can further improve the measurement accuracy.

In summary, the embodiments described above are merely illustrative of the present application, and are not intended to limit the scope of the present application. It should be understood that various modifications, replacements and improvements made by those of ordinary skill in the art without departing from the spirit of this application shall fall within the scope of the disclosure defined by the appended claims.

What is claimed is:

1. A length measurement method for a conical workpiece, comprising:
   symmetrically arranging a first displacement sensor and a second displacement sensor at two opposite sides of a to-be-measured conical workpiece, respectively;
   obtaining a distance $X_0$ from each of the first displacement sensor and the second displacement sensor to a bottom plane of the to-be-measured conical workpiece through pre-calibration;
   arranging a base plate in an elongated shape at a tip of the to-be-measured conical workpiece; and
   measuring, by the first displacement sensor, a distance from the first displacement sensor to the base plate, and measuring, by the second displacement sensor, a distance from the second displacement sensor to the base plate; and
   calculating a total length X of the to-be-measured conical workpiece as according to the following formula: $X=X_0+(X_1+X_2)/2$, wherein $X_1$ is the distance from the first displacement sensor to the base plate, and $X_2$ is the distance from the second displacement sensor to the base plate;
   wherein factors affecting length measurement of the to-be-measured conical workpiece comprise tooling-based calibration of a fixed length $X_0$, measurement accuracy of the first displacement sensor and the second displacement sensor and a tilt error of the base plate;
   the tilt error of the base plate is analyzed through the following steps:
   letting the tip of the to-be-measured conical workpiece or a limited portion of the to-be-measured conical workpiece in contact with the base plate be in a sphere shape, and expressing a sphere equation as follows with a sphere center as an origin of a coordinate system:

$$x^2+y^2+z^2=R^2;$$

wherein R is a sphere radius, and coordinates of a vertex of the to-be-measured conical workpiece are (0, 0, R);
   considering a measurement error caused by the fact that a contact point between the to-be-measured conical workpiece and the base plate is not exactly at the vertex during actual measurement, letting an angle between the contact point and an x-axis be $\theta$, and an angle between a projection of the contact point on a y-z plane and a y-axis be $\varphi$, such that coordinates of the contact point are expressed as:

$$(x,y,z)=(R\cos\theta, R\cos\varphi\sin\theta, R\sin\varphi\sin\theta);$$

wherein $\varphi \in (0, 2\pi)$, and $\theta$ is required to be as small as possible, and a tangent plane of the base plate defined by the contact point is expressed as:

$$\cos\theta x + \cos\varphi\sin\theta y + \sin\varphi\sin\theta z = R;$$

letting the first displacement sensor and the second displacement sensor be both arranged on a z-axis, and coordinates of the first displacement sensor and the second displacement sensor are P1 (0,−b) and P2 (0,b), respectively, an x-axis coordinate of an intersection point between a laser emitted by the first displacement sensor and a plane of the base plate, and an x-axis coordinate of an intersection point between a laser emitted by the second displacement sensor and the plane of base plate are respectively expressed as:

$$x_1 = \frac{R + b\sin\varphi\sin\theta}{\cos\theta} \text{ and } x_2 = \frac{R - b\sin\varphi\sin\theta}{\cos\theta};$$

(i) in a first case where the contact point between the plane of the base plate and the tip of the to-be-measured conical workpiece is at the vertex, $\theta=0$, and $x_1=x_2=R$, calculating a height h of a sphere top by averaging distances measured by the first displacement sensor and the second displacement sensor, expressed as:

$$h = \frac{x_1 + x_2}{2} = R;$$

and
   (ii) in a second case where the contact point between the plane of the base plate and the tip of the to-be-measured conical workpiece is offset from the vertex, calculating the height h of the sphere top by averaging the distances measured by the first displacement sensor and the second displacement sensor, expressed as:

$$h = \frac{x_1 + x_2}{2} = \frac{R}{\cos\theta},$$

wherein an error E between the height h and a true value R is expressed as:

$$E = \frac{h-R}{R} = \frac{1-\cos\theta}{\cos\theta};$$

it is obtained that a measurement error of the first displacement sensor and the second displacement sensor is only related to the angle θ between the contact point and the x-axis, and is unrelated to the angle φ between the contact point and the y-axis; and analyzing a difference Δx between the distances measured by the first displacement sensor and the second displacement sensor, wherein a relationship between the difference Δx, the angle θ and the angle φ is expressed as:

$$\Delta x = x_1 - x_2 = \frac{2b\sin\varphi\sin\theta}{\cos\theta} = 2b\sin\varphi\tan\theta;$$

the difference between the distances measured by the first displacement sensor and the second displacement sensor depends on the angle θ, and an upper limit of the difference is determined by the angle θ, and the angle φ makes the difference change sinusoidally within a range of the upper limit; the to-be-measured conical workpiece is measured multiple times, and a minimum measured value is used as a final length measurement result.

2. A length measurement method for a conical workpiece, comprising:

arranging a to-be-measured conical workpiece in a tooling, symmetrically arranging a first displacement sensor and a second displacement sensor at two opposite sides of the tooling, respectively;

obtaining a distance $X_0$ from each of the first displacement sensor and the second displacement sensor to a bottom plane of the to-be-measured conical workpiece through pre-calibration;

arranging a base plate in an elongated shape at a tip of the to-be-measured conical workpiece; and measuring, by the first displacement sensor, a distance from the first displacement sensor to the base plate, and measuring, by the second displacement sensor, a distance from the second displacement sensor to the base plate; and calculating a total length X of the to-be-measured conical workpiece as according to the following formula: $X=X_0+(X_1+X_2)/2$, wherein $X_1$ is the distance from the first displacement sensor to the base plate, and $X_2$ is the distance from the second displacement sensor to the base plate;

wherein factors affecting length measurement of the to-be-measured conical workpiece comprise tooling-based calibration of a fixed length $X_0$, measurement accuracy of the first displacement sensor and the second displacement sensor and a tilt error of the base plate;

the tilt error of the base plate is analyzed through the following steps:

letting the tip of the to-be-measured conical workpiece or a limited portion of the to-be-measured conical workpiece in contact with the base plate be in a sphere shape, and expressing a sphere equation as follows with a sphere center as an origin of a coordinate system:

$$x^2+y^2+z^2=R^2;$$

wherein R is a sphere radius, and coordinates of a vertex of the to-be-measured conical workpiece are (0, 0, R);

considering a measurement error caused by the fact that a contact point between the to-be-measured conical workpiece and the base plate is not exactly at the vertex during actual measurement, letting an angle between the contact point and an x-axis be θ, and an angle between a projection of the contact point on a y-z plane and a y-axis be φ, such that coordinates of the contact point are expressed as:

$$(x,y,z)=(R\cos\theta, R\cos\varphi\sin\theta, R\sin\varphi\sin\theta);$$

wherein $\varphi \in (0,2\pi)$, and θ is required to be as small as possible, and a tangent plane of the base plate defined by the contact point is expressed as:

$$\cos\theta x+\cos\varphi\sin\theta y+\sin\varphi\sin\theta z=R;$$

letting the first displacement sensor and the second displacement sensor be both arranged on a z-axis, and coordinates of the first displacement sensor and the second displacement sensor are P1 (0,−b) and P2 (0,b), respectively, an x-axis coordinate of an intersection point between a laser emitted by the first displacement sensor and a plane of the base plate, and an x-axis coordinate of an intersection point between a laser emitted by the second displacement sensor and the plane of base plate are respectively expressed as:

$$x_1 = \frac{R+b\sin\varphi\sin\theta}{\cos\theta} \text{ and } x_2 = \frac{R-b\sin\varphi\sin\theta}{\cos\theta};$$

(i) in a first case where the contact point between the plane of the base plate and the tip of the to-be-measured conical workpiece is at the vertex, θ=0, and $x_1=x_2=R$, and calculating a height h of a sphere top by averaging distances measured by the first displacement sensor and the second displacement sensor, expressed as:

$$h = \frac{x_1+x_2}{2} = R;$$

and (ii) in a second case where the contact point between the plane of the base plate and the tip of the to-be-measured conical workpiece is offset from the vertex, calculating the height h of the sphere top by averaging the distances measured by the first displacement sensor and the second displacement sensor, expressed as:

$$h = \frac{x_1+x_2}{2} = \frac{R}{\cos\theta},$$

wherein an error E between the height h and a true value R is expressed as:

$$E = \frac{h-R}{R} = \frac{1-\cos\theta}{\cos\theta};$$

it is obtained that a measurement error of the first displacement sensor and the second displacement sensor is only related to the angle θ between the contact point and the x-axis, and is unrelated to the angle $\varphi$ between the contact point and the y-axis; and analyzing a difference $\Delta x$ between the distances measured by the first displacement sensor and the second displacement sensor, wherein a relationship between the difference $\Delta x$, the angle $\theta$ and the angle $\varphi$ is expressed as:

$$\Delta x = x_1 - x_2 = \frac{2b\sin\varphi\sin\theta}{\cos\theta} = 2b\sin\varphi\tan\theta;$$

the difference between the distances measured by the first displacement sensor and the second displacement sensor depends on the angle $\theta$, and an upper limit of the difference is determined by the angle $\theta$, and the angle $\varphi$ makes the difference change sinusoidally within a range of the upper limit; the to-be-measured conical workpiece is measured multiple times, and a minimum measured value is used as a final length measurement result.

3. The length measurement method of claim 2, wherein the distance from each of the first displacement sensor and the second displacement sensor to the bottom plane of the to-be-measured conical workpiece is determined by machining of the tooling and actual installation of the first displacement sensor and the second displacement sensor.

* * * * *